July 22, 1924.

M. LEBEIS 1,502,388

ADDING MACHINE

Filed March 19, 1923   6 Sheets-Sheet 1

Fig. 1.

Inventor

Martin Lebeis

July 22, 1924.

M. LEBEIS

ADDING MACHINE

Filed March 19, 1923   6 Sheets-Sheet 2

1,502,388

Inventor

Martin Lebeis

July 22, 1924.
M. LEBEIS
1,502,388
ADDING MACHINE
Filed March 19, 1923  6 Sheets-Sheet 3
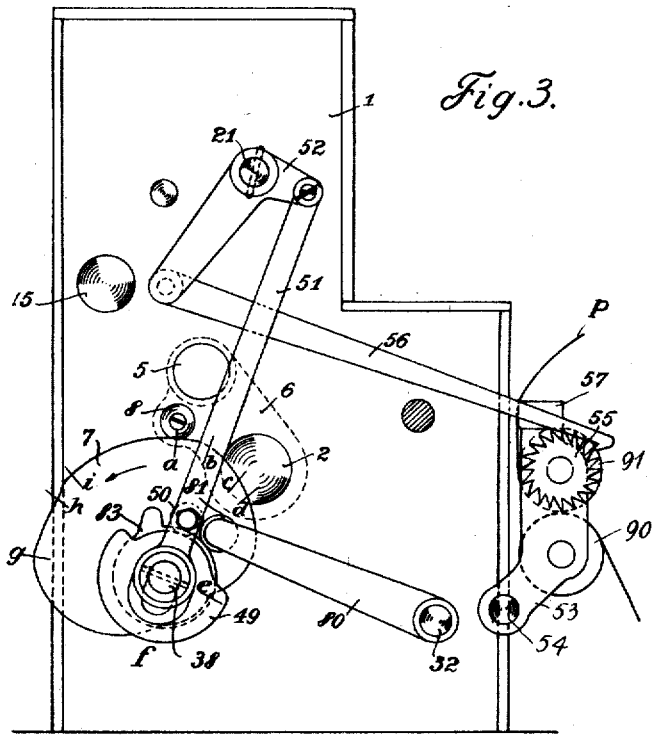
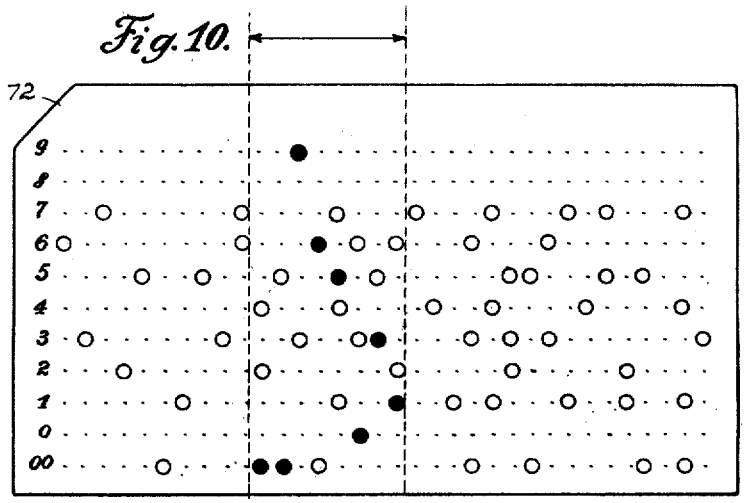
Inventor:
Martin Lebeis

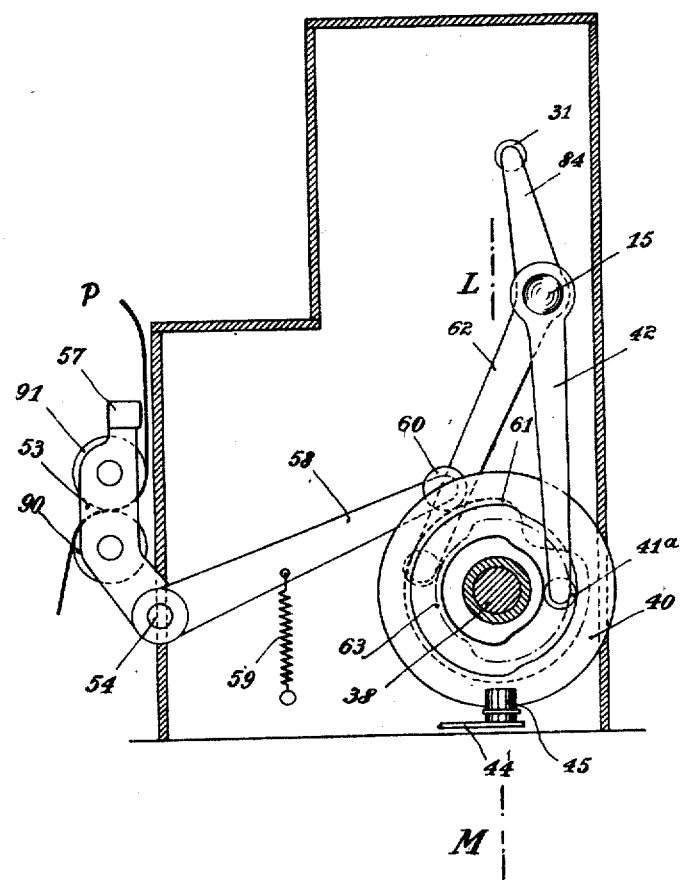

July 22, 1924.

M. LEBEIS

ADDING MACHINE

Filed March 19, 1923

1,502,388

6 Sheets-Sheet 5

Inventor:

Martin Lebeis

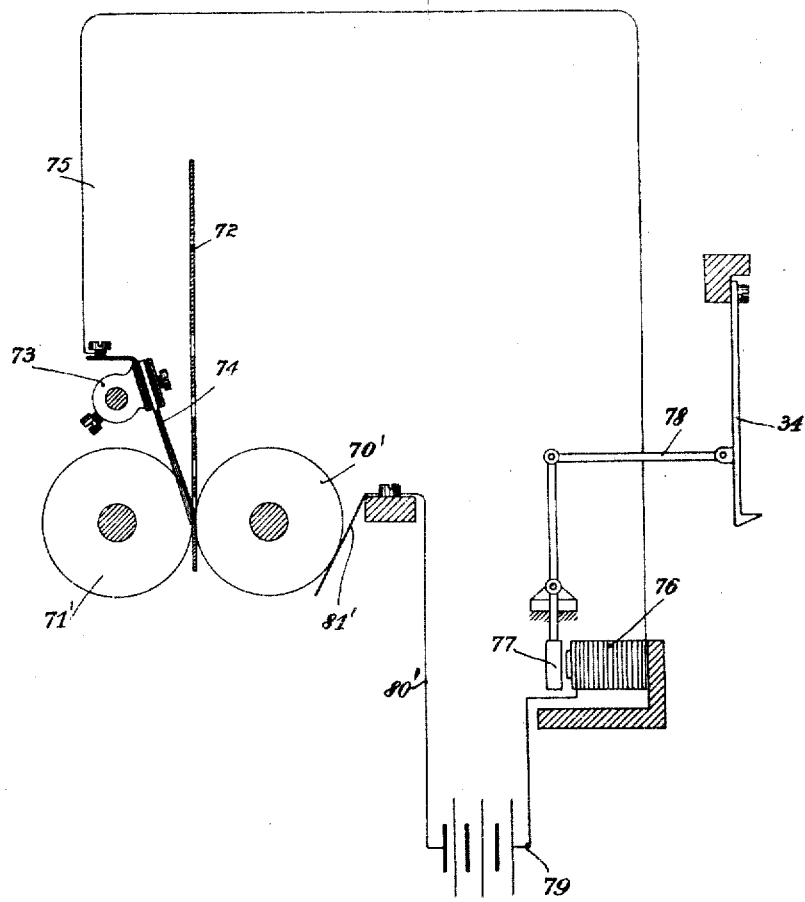

Patented July 22, 1924.

1,502,388

UNITED STATES PATENT OFFICE.

MARTIN LEBEIS, OF BERLIN-FRIEDENAU, GERMANY, ASSIGNOR, BY MESNE ASSIGNMENTS, TO NAAMLOOZE VENNOOTSCHAP MACHINA MAATSCHAPPIJ VOOR HANDEL EN INDUSTRIE, OF AMSTERDAM, NETHERLANDS.

ADDING MACHINE.

Application filed March 19, 1923. Serial No. 626,171.

*To all whom it may concern:*

Be it known that I, MARTIN LEBEIS, a citizen of the German Republic, residing at Berlin-Friedenau, Germany, have invented certain Improvements in Adding Machines, for which I have filed an application in Germany on October 20th, 1919, and of which the following is a specification.

This invention relates to an adding machine particularly for adding the numbers represented by differently disposed perforations on statistical and like cards, and the invention consists essentially in arranging the numeral wheels of a totalizing counter on a rock shaft whereby they are alternately brought into mesh with setting sectors and with sectors effecting the transfer of the tens, the setting sectors being themselves set through the medium of the cards and their setting movement communicated to the totalizing counter while they are returning to their initial position. Means are also provided whereby the items are printed continuously and the totals whenever desired, by the same type wheels and with the exclusion of ciphers in front of the significant figures.

Figure 2:
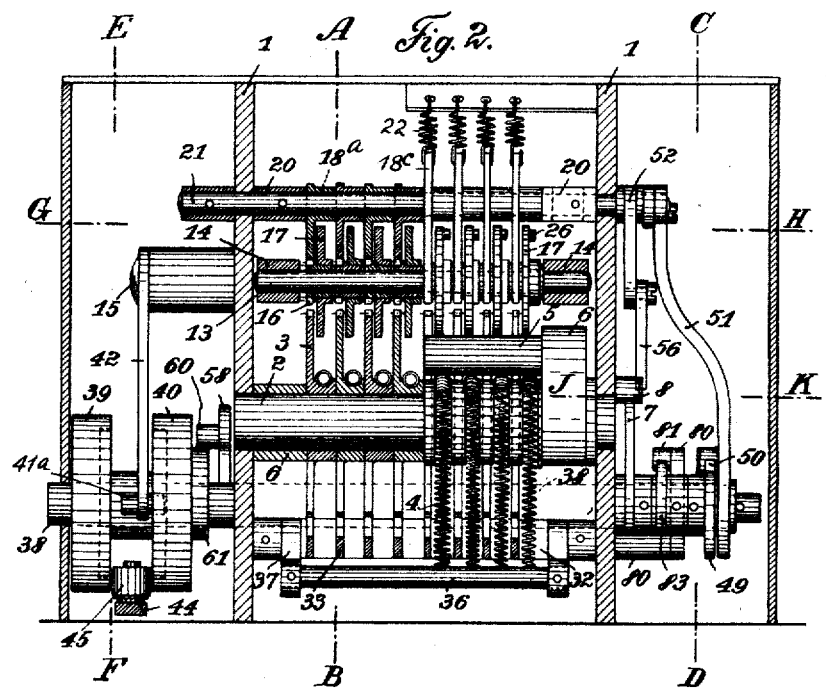

Fig. 1 of the accompanying drawings represents a vertical section of the machine taken on the line A—B of Fig. 2, which is a vertical section on the line N—O of Fig. 1.

Fig. 3 is a vertical section on the line C—D,

Fig. 4, a vertical section on the line E—F, and

Figure 5:
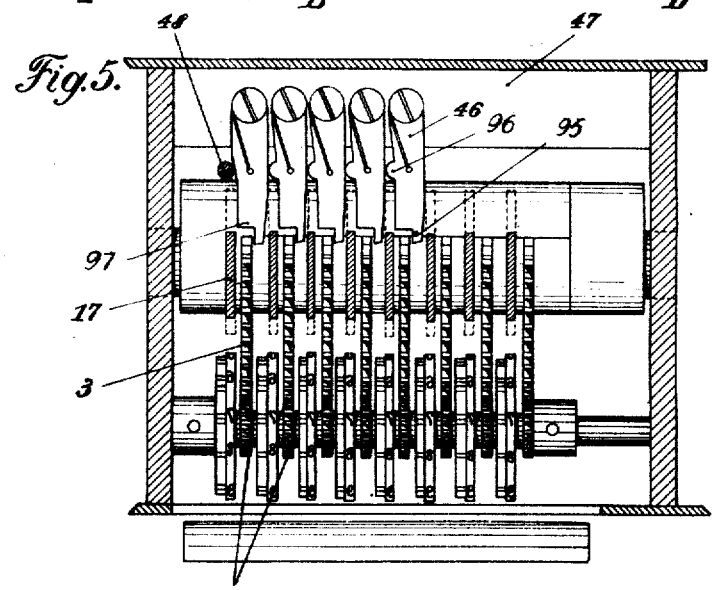

Fig. 5, a horizontal section on the line G—H, all of Fig. 2.

Figure 6:
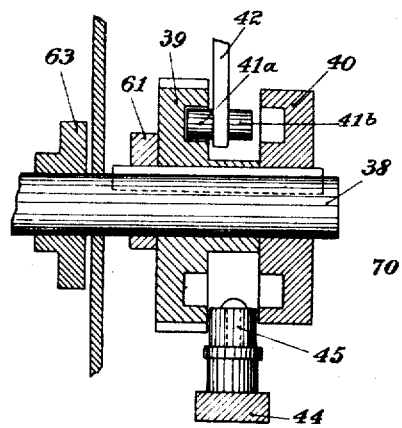

Fig. 6 is a section on the line L—M of Fig. 4, and

Figure 7:
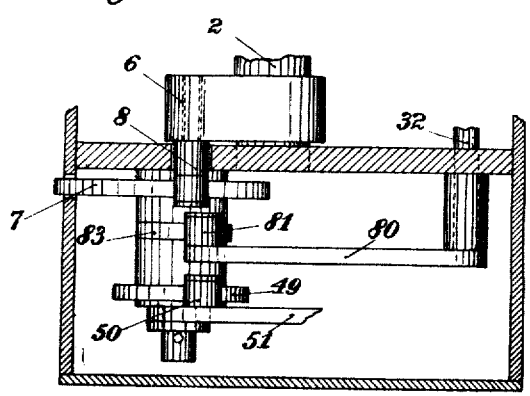

Fig. 7, a section on the line J—K of Fig. 2.

Figure 8:
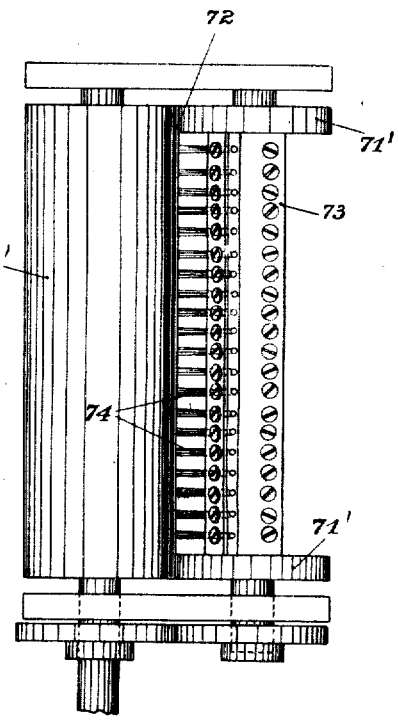

Fig. 8 is a plan of an electric setting device,

Fig. 9, a diagrammatic side view of the same showing the electric connections, and Fig. 10, a view of one of the cards.

On a shaft 2 which is held in two vertical plates 1, a plurality of setting sectors 3 is rotatably arranged, one sector being provided for each plate in the numbers to be dealt with. The sectors are independent of each other, and each sector is actuated by a spring 4 which tends to turn it on the shaft. The movement is normally opposed by a universal bar 5 which rocks by means of arms 6 about the shaft 2. The bar 5 is controlled by a cam 7 which is mounted on a shaft 38, one of the arms 6 being provided with a roller 8 (Figs. 2, 3 and 7) whereby it bears against the cam. Each sector meshes with a pinion 9 which is formed with 11 teeth and which is connected to a ratchet wheel 10 and to a type wheel 11. The ratchet wheel is provided with 11 teeth ten of which are represented by types on the wheel 11, the latter having one blank space. The types carry the figures 1 to 9 and 0. Each ratchet wheel cooperates with a detent lever 33 which turns loosely about a shaft 32 and which is influenced by a spring 35 tending to turn it into engagement with the wheel for arresting its movement. Normally the levers 33 are held out of engagement with the ratchet wheels by spring catches 34 connected to a support 47. Operated detent levers are restored to the normal position by a universal bar 36 which for that purpose is operated by a tappet 83 (Fig. 3) formed on a disc connected to the cam shaft 38. A lever arm 80, which is supported on the edge of the tappet disc by means of a roller 81, is secured to the shaft 32 which carries the bar 36 by means of rigid arms 37.

The items set up by means of the sectors on the type wheels 11 are printed from these onto a paper strip P which is taken past a platen 57 by means of two friction rollers 90 and 91, an ink ribbon F being interposed between the paper and the type wheels. The friction rollers are mounted, together with the platen 57 in a frame 53 which rocks about a shaft 54. A lever 58 (Fig. 4) secured to the shaft 54, carries at its free end a roller 60 whereby it is supported on the edge of a cam 61 on the shaft 38. A spring 59 acts on the lever and causes the platen to be applied to the type wheels when the roller 60 drops into the notch of the cam. Fig. 3 shows the arrangement for feeding the paper strip, the feed roller 91 being connected to a ratchet wheel 55 which is engaged and turned by a hooked bar 56. The latter is pivoted to a bell-crank 52 mounted on a shaft 21 which is rocked by a cam 49 secured to the cam shaft 38. A rod 51, which is guided by the cam shaft, communicates the movement from the cam to the lever 52 by means of a roller 50.

There is a totalizing counter composed of numeral wheels 17 which are loosely arranged on a shaft 13, each wheel being connected to a pinion 16 having ten teeth. The shaft 13 is held by arms 14 on a rock shaft 15 which is actuated by either of two cams 39 and 40 (Figs. 2 and 4). An arm 42 connected to the shaft 15 carries at its free end two coaxial rollers 41ª and 41ᵇ arranged at opposite sides (Fig. 6) for engagement with grooves, one in the cam 39 and the other in the cam 40. The cams are feathered on the shaft 38 and controlled by a setting lever 44 the free end of which carries a roller 45 which is disposed between the two cams. The lever 44 is operated by hand for putting the lever 42 into engagement with either cam.

The transfer of the tens is effected by means of sectors 18ª arranged loosely on the shaft 21. The pinions 16 are normally held in contact with these sectors which hold the numeral wheels in operated position with the total appearing in a window 43. The shaft 15 is rocked for bringing the pinions into mesh with the sectors 3 for receiving the items from the latter. The sectors 18ª are integral with lever arms 18ᵇ and 18ᶜ, the latter of which are actuated by springs 22 tending to turn the sectors, the movement being normally prevented by the abutment of the arm 18ᵇ against a universal bar 19 which is connected by arms 20 to the shaft 21 so as to be rocked by the latter. The movement of the sectors is also prevented by double-armed levers 24, each sector being formed with a nose-piece 18ᵈ which bears normally against a shoulder 29 on one of said levers. Springs 25 hold the levers 24 in contact with the nose-pieces 18ᵈ which are released by studs 26 connected to the numeral wheels so as to turn the levers 24 when the wheels enter the zero position. When a lever 24 is thus turned by its allotted stud 26, it is retained in operated position by a spring catch 30 which snaps behind a tooth 27 formed on the lever. The levers are released by the spring catches by means of a universal bar 31 which is held by arms 84 so that it can rock loosely about the shaft 15 for depressing the catches. One of the arms 84 is integral with a lever arm 62 (Fig. 4) which is controlled by a cam 63 mounted on the shaft 38.

The sectors 3 may be set electrically by means of the device illustrated in Figs. 8 and 9, the perforated cards 72 being taken by a feed roller 70′ and marginal clamping discs 71′ past a series of contact brushes 74 which make contact with the roller 70′ through the perforations of the card. The brushes are fitted in a holder 73 and each brush is connected by a wire 75 to an electromagnet 76 whose armature 77 operates, by means of a lever and a connecting link 78, one of the spring catches 34 which retain the detent levers 33. The magnets are energized by a battery 79 which is connected by a wire 80′ to a brush contact 81′ which slides on the roller 70′. The latter is geared to the cam shaft 38 so as to perform the same number of revolutions, and the diameter of the roller is chosen so that one revolution takes the card right through the machine.

Fig. 10 shows a card by way of example. The portion enclosed between the dotted lines is the one to be dealt with by the adding machine and it contains as many places as there are setting sectors and numeral wheels in the machine. The black circles indicate perforations, each one being made opposite the figure it represents and in the place to which it belongs. Thus in the present instance the perforations represent the number 965031. There is also, at the foot of the card, which enters first into the machine, a line marked 00. In this line perforations are made in all the places to the left of the first significant figure. The card in Fig. 10, for instance, has two perforations in the line 00, since the machine contains eight places and since the number punched on the card only contains six places.

Fig. 3 shows the cam 7 in the normal position. The portion a—b of the cam is concentric with the shaft, and while the cam moves through this distance the line 00 of the card passes under the contact brushes. The perforations of this line cause the respective catches 34 to be withdrawn and their detent levers 33 to be applied to the ratchet wheels 10 so as to prevent them and their sectors 3 from moving from their initial position. While the remaining card lines pass the brushes 74, the curve b—c, through c and d, passes under the roller 8 and causes the bar 5 to descend and the unlocked sectors 3 to turn through ten cogspaces, one cog for each line. Each line in which a perforation occurs causes a detent 33, corresponding to the place which the perforation occupies, to be applied to the respective ratchet wheel 10 so as to stop further movement of the sector and of the type wheel. Thus the number represented on the card will be set up by the type wheels in front of the platen 57, the appearance of zeros in front of the first significant figure being prevented by the perforations made in the line 00. While the curve e—f, which is concentric with the shaft, passes under the roller 8, the platen is applied to the type wheels for printing the item. At the same time the shaft 15 is operated so as to bring the pinions 16 into gear with the sectors 3. Then the cam curve f—g comes into play and turns the bar 5 back through 10/11ths of its stroke so that the type wheels 10 will be zeroized. As the return movement of the sectors will in each case be equal to the forward movement, the numeral wheels 17 will be set to the number represented on the card. The cam curve $g-h$ is also concentric with the shaft, and while it passes under the roller 8, the pinions 16 will be restored to their contact with the sectors 18$^a$, and the number printed on the strip P will appear in the window 43. The cam curve $h-i$ restores the sectors 3 and the type wheels to their initial position whereupon, while the concentric curve $i-a$ passes under the roller 8, the bar 36 is operated for re-engaging the detents 33 to the spring catches 34.

Each succeeding card passed through the machine repeats the operation. The item of each card will be printed separately on the strip P and added to the total shown by the numeral wheels 17. Any numeral wheel reaching the zero position causes, by means of its stud 26, the lever 24 of the next higher denomination to be turned out of engagement with the nose-piece 18$^d$ and to be arrested by the catch 30 clear of the path of the nose-piece and of the respective sectors 18$^a$. After the pinions 16 have been brought back into mesh with the sectors 18$^a$, the bar 19 is lowered, and the sectors previously freed by means of the studs 26 will be turned by the springs 22 through one tooth space, thereby effecting the transfer. Any numeral wheel reaching the zero position during such transfer will cause the release also of the wheel of the denomination next higher to it so as to pass on the transfer to the latter. While the pinions 16 are in mesh with the sectors 3, the sectors 16 are restored to the initial position by the cam 49 and the bar 19, the catches 30 being at the same time operated by the cam 63 and the bar 31 so as to release the levers 24 and cause the sectors 18$^a$ to be re-arrested thereby.

The total appearing on the totalizing counter can be printed on the strip P by means of the type wheels 11 whenever desired. For this purpose the lever 44 is reversed so as to place the lever 42, whereby the rock shaft 15 is operated, under the control of the cam 40 whereupon the shaft 38 is turned without the insertion of any card. The pinions 16 are, after the sectors 3 have moved through one tooth space and turned the type wheels to the zero position, put into gear with the sectors 3 so as to be rotated thereby in the reverse direction. Each numeral wheel 17 is formed with a circumferential lug 70 which normally passes through a gateway formed for the same in a bar 71. The latter is axially displaceable and is coupled to the lever 44 so as to be shifted simultaneously with the same for putting the gateways out of register with the lugs. The bar will thus form a stop for the wheels and cause them to be arrested in the zero position when turned backwards by means of the sectors 3. The latter and the type wheels will also be arrested, and as the forward movement of the type wheels is exactly equal to the rearward movement of the respective numeral wheels, the same number will be presented for printing as previously appeared on the totalizing counter.

The numeral wheels may either be returned to the initial position before the return of the sectors 3, in which case the totalizing counter will remain zeroized, or left in contact with their sectors until the type wheels have been zeroized, in which case the printed total will be carried forward for further addition.

In order to avoid the printing of ciphers in front of the significant figures of the total, the following arrangement is provided:

A plurality of pivoted arms 46, one for each sector 3, is arranged so as to be movable in a horizontal plane. The free end of each lever has a portion 95 (Fig. 5) adapted to be placed in front of the sector 3 so as to prevent the latter from leaving its position of rest. Another portion 97 of the end of the arm is by the same movement adapted to enter a notch 85 (Fig. 1) formed on the respective numeral wheel 17 so as to prevent the latter from moving from the zero position. The arms are spring-actuated and tend to move into engagement with the sectors and with the numeral wheels, but are normally prevented from so doing by a stop 48 (Fig. 5) against which the first arm rests, the other arms being supported on each other by means of projections 96. The stop 48 is connected to the lever 44, so as to be shifted together with the latter for releasing the arms 46, when the total is to be printed. The numeral wheel bearing the first significant figure will have its notch 85 out of register with the arm 46 which is therefore unable to engage it, and as it supports all the arms behind it, these will also be unable to engage the numeral wheels even if they are zeroized. The arms in front of the first significant figure, however, will be able to enter into engagement with the numeral wheels as well as with the respective sectors 3, and the latter and their type wheels will remain in their position of rest, and no ciphers will be printed in these places.

It is evident that the spring catches 34 may be operated by mechanical instead of electrical means and that the various devices may be applicable to other than card-controlled machines.

I claim:—

1. A machine for adding items expressed by perforations made in a card, comprising a series of spring-pressed setting sectors, a supporting bar normally preventing the sectors from moving, means for retracting the bar to allow the sectors to move forwards, means for returning the bar and the sectors to the initial position, ratchet wheels geared to the sectors, spring-pressed detent levers tending to engage said ratchet wheels so as to prevent the sectors from moving forwards, spring catches normally holding said detent levers out of engagement with the ratchet wheels, card-controlled means for releasing the detent levers from the catches so as to arrest the sectors, type wheels connected to the ratchet wheels so as to be set thereby during the forward movement of the sectors, a totalizing counter comprising a series of numeral wheels, said numeral wheels being arranged so that they can be geared to the sectors during the rearward movement for performing the addition and during the forward movement for zeroizing and for transferring the total to the type wheels and so that they can be disengaged from the sectors either zeroized or after being restored to show the total, means for taking prints from the type wheels after each setting, and means for transferring the tens.

2. A machine for adding items expressed by perforations made in a card, comprising a series of spring-pressed setting sectors, a series of type wheels provided with eleven spaces of which one is empty, said type wheels being geared to the sectors so as to be set thereby and so that the empty space is normally in the printing position, a bar supporting the sectors so as to prevent them normally from moving, means for retracting the bar so as to allow the sectors to move forwards, means for returning the bar and the sectors to the initial position, card-controlled means for arresting the movement of the sectors and of the type wheels in accordance with the number to be set up, card-controlled means for preventing all movement of sectors and type wheels in front of the first significant figure, a totalizing counter comprising a series of numeral wheels, means for gearing said numeral wheels to the sectors during the return movement so as to perform the addition, means for transferring the tens, means for gearing the numeral wheels to the sectors during the forward movement when the total is to be printed so as to receive motion therefrom in the reverse direction, means for stopping the backward motion of the numeral wheels when they arrive in the zero position so that the type wheels will be set for printing the total, and means for taking prints from the type wheels after each setting.

3. A machine for adding items expressed by perforations made in a card, comprising a series of spring-pressed setting sectors, a series of type wheels provided with eleven spaces of which one is empty, said type wheels being geared to the sectors so as to be set thereby and so that the empty space is normally in printing position, a bar supporting the sectors so as to prevent them normally from moving, means for retracting the bar so as to allow the sectors to move forwards, means for returning the bar and the sectors to the normal position, card-controlled means for arresting the movement of the sectors and of the type wheels in accordance with the number to be added, card-controlled means for preventing all movement of sectors and type wheels in front of the first significant figure, a totalizing counter comprising a series of numeral wheels, means for gearing said numeral wheels to the sectors during the return movement so as to perform the addition, means for transferring the tens, means for gearing the numeral wheels to the sectors during the forward movement when the total is to be printed so as to receive motion therefrom in the reverse direction, means for stopping the backward motion of the numeral wheels when they arrive in the zero position so that the type wheels will be set for printing the total, a series of pivoted spring-pressed arms tending to enter the path of the sectors so as to prevent them from moving, the arms being restrained by non-zeroized numeral wheels and held by the latter out of engagement with the sectors, the arms being also restrained by each other so that only arms at the left of the first significant figure can enter into engagement with their sectors, means for holding all the arms in inoperative position during the adding operation, means for putting them into operation when the total is to be printed, and means for taking prints from the type wheels after each setting.

MARTIN LEBEIS.